United States Patent
Hall (10) Patent No.: US 11,107,161 B1
(45) Date of Patent: Aug. 31, 2021

(54) SYSTEM AND METHOD USING ELECTRONIC INSURANCE CARD TO FACILITATE EXCHANGING INFORMATION AND REPORTING CLAIMS

(71) Applicant: STATE FARM MUTUAL AUTOMOBILE INSURANCE COMPANY, Bloomington, IL (US)

(72) Inventor: Ivan D Hall, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 304 days.

(21) Appl. No.: 15/236,976

(22) Filed: Aug. 15, 2016

Related U.S. Application Data (60) Provisional application No. 62/320,171, filed on Apr. 8, 2016, provisional application No. 62/326,399, filed on Apr. 22, 2016.

(51) Int. Cl.
*G06Q 40/08* (2012.01)
(52) U.S. Cl.
CPC .................................. *G06Q 40/08* (2013.01)
(58) Field of Classification Search
CPC .............................. G06Q 40/08; G06Q 10/10
See application file for complete search history.

(56) References Cited

U.S. PATENT DOCUMENTS

| | | | |
|---|---|---|---|
| 8,494,938 B1 * | 7/2013 | Kazenas | G06Q 40/08 705/35 |
| 9,325,807 B1 | 4/2016 | Meoli et al. | |

(Continued)

FOREIGN PATENT DOCUMENTS

KR    1656302 B1 *  3/2016

OTHER PUBLICATIONS

K. M. Derdus and V. G. Ozianyi, "A mobile solution for road accident data collection," Proceedings of the 2nd Pan African International Conference on Science, Computing and Telecommunications (PACT 2014), 2014, pp. 115-120, doi: 10.1109/SCAT.2014.7055140. (Year: 2014).*

(Continued)

*Primary Examiner* — Virpi H Kanervo
(74) *Attorney, Agent, or Firm* — Faegre Drinker Biddle & Reath LLP (57) ABSTRACT

A system and method for exchanging insurance information and initiating an insurance loss report and/or claim using a mobile communications device, such as a smartphone. The information of a first party is stored on an electronic insurance card (e.g., virtual insurance card) on the mobile device, and transmitted to a second party's mobile device. The information of the second party is captured on the first party's mobile device, either by being similarly transmitted or photographed. The report and/or claim may be initiated by transmitting the parties' information to an insurance provider. A procedure for initiating the insurance report and/or claim with a second insurance provider may be determined based upon the information of the second party, and may include transmitting the parties' information to the second insurance provider or to its agent. Electronic images taken with the mobile device and/or a geographic location determined by the mobile device may be transmitted as well.

20 Claims, 4 Drawing Sheets

(56) References Cited

U.S. PATENT DOCUMENTS

| | | | | |
|---|---|---|---|---|
| 9,443,270 | B1* | 9/2016 | Friedman | G06Q 40/08 |
| 10,032,226 | B1* | 7/2018 | Suizzo | G06Q 10/10 |
| 10,121,148 | B1* | 11/2018 | Kozlowski | G07F 7/1008 |
| 10,767,517 | B2* | 9/2020 | Elendt | F01L 1/2405 |
| 2011/0015946 | A1* | 1/2011 | Buckowsky | G06Q 40/08 |
| | | | | 705/3 |
| 2012/0109690 | A1* | 5/2012 | Weinrauch | G06Q 10/10 |
| | | | | 705/4 |
| 2013/0297353 | A1 | 11/2013 | Strange et al. | |
| 2014/0006061 | A1 | 1/2014 | Watanabe et al. | |
| 2014/0244312 | A1 | 8/2014 | Gray et al. | |
| 2015/0172894 | A1 | 6/2015 | Gershon | |

OTHER PUBLICATIONS

Prabha et al. Automatic Vehicle Accident Detection and Messaging System Using GSM and GPS Modem. International Journal of Advanced Research in Electrical, Electronics and Instrumentation Engineering. Vol. 3, Issue 7, Jul. 2014. (Year: 2014).*

An image of a typical State Farm Insurance Card dated Sep. 28, 1997.

"Mobile First Notice of Loss: Claim Assistance in Your Pocket" by Oliver Baecker, et al., published on May 11, 2009 by Springer Berlin Heidelberg for the 7th International Conference on Pervasive Computing in Nara, Japan.

* cited by examiner

SYSTEM AND METHOD USING ELECTRONIC INSURANCE CARD TO FACILITATE EXCHANGING INFORMATION AND REPORTING CLAIMS

RELATED APPLICATION

The present U.S. provisional patent application is related to a first prior-filed U.S. provisional patent application having the same title, Ser. No. 62/320,171, filed Apr. 8, 2016, and to a second prior-filed U.S. provisional patent application having the same title, Ser. No. 62/326,399, filed Apr. 22, 2016. The entire contents of the identified earlier-filed patent applications are hereby incorporated by reference into the present patent application as if fully set forth herein.

FIELD OF THE DISCLOSURE

The present disclosure generally relates to systems and methods for facilitating exchanging insurance information and initiating loss reports and/or claims, and more particularly, to a system and computer-implemented method including an electronic insurance card containing insurance information for storage on a mobile communications device and configured to be transmitted to another mobile communications device during initial information exchange and to be transmitted to an insurance provider during insurance loss report and/or claim initiation.

BACKGROUND

In some situations in which insured parties are involved in accidents, injuries, or other losses, there may be little or no time to gather the information necessary to properly and expeditiously file insurance loss reports and/or claims at the scenes or times of the incidents. For example, at the scene of a vehicular accident, the parties may exchange insurance information to facilitate filing an insurance loss report and/or claim at a later time. However, when it is not possible to quickly exchange information at the scene, one party may have to wait for a police report to obtain insurance information for the other involved party, which may take days or weeks. Further, in any such information exchange, human error may result in obtaining incorrect information, which may significantly delay the filing or processing of a claim.

BRIEF SUMMARY

Embodiments of the present technology relate to systems and computer-implemented methods including an electronic insurance card containing insurance information for storage on a mobile communications device and configured to be transmitted to another mobile communications device during initial information exchange and to be transmitted to an insurance provider during loss report and/or claim initiation.

In a first aspect, a computer-implemented method may be provided for improving the functionality of a computer for facilitating exchanging insurance information and initiating an insurance loss report and/or claim using a mobile communications device. First insurance information may be stored on a first electronic insurance card which may be accessible by a first mobile communications device of a first party. The first insurance information may be transmitted from the first mobile communications device of the first party to a second mobile communications device of a second party. Second insurance information of the second party may be captured at the first mobile communications device of the first party. The insurance loss report and/or claim may be electronically initiated with an insurance provider by transmitting the first insurance information of the first party and the second insurance information of the second party from the first mobile communications device to the insurance provider via an electronic communications network. As a result, the auto insurance claim process may be enhanced. The method may include additional, less, or alternate actions, and may be implemented via one or more processors, sensors, and/or transceivers.

In a second aspect, a computer system may be provided for facilitating exchanging insurance information and initiating an insurance loss report and/or claim using a mobile communications device having a memory element configured to store electronic data, a processing element configured to execute a software application, and/or a communications element configured to communicate electronic data via an electronic communications network. A first electronic insurance card containing first insurance information may be accessible by a first mobile communications device of a first party. A software application may be stored on the memory element and may be executable by the processing element of the first mobile communications device to do the following. The first insurance information may be transmitted from the first mobile communications device of the first party to a second mobile communications device of a second party. Second insurance information of the second party may be captured at the first mobile communications device of the first party. The insurance loss report and/or claim may be electronically initiated with an insurance provider by transmitting the first insurance information of the first party and the second insurance information of the second party from the first mobile communications device to the insurance provider via the communications element and the electronic communications network. As a result, auto insurance claim handling or processing may be enhanced. The computer system may include additional, less, or alternate functionality, including that discussed elsewhere herein.

In a third aspect, a non-transitory computer-readable medium with an executable program stored thereon may be provided for facilitating exchanging insurance information and initiating an insurance loss report and/or claim using a mobile communications device. First insurance information may be stored on a first electronic insurance card which may be accessible by a first mobile communications device of a first party. The first insurance information may be transmitted from the first mobile communications device of the first party to a second mobile communications device of a second party. Second insurance information of the second party may be captured at the first mobile communications device of the first party. The insurance loss report and/or claim may be initiated with an insurance provider by transmitting the first insurance information of the first party and the second insurance information of the second party from the first mobile communications device to the insurance provider via an electronic communications network. The executable program may include computer-readable instructions that direct processors to perform additional, less, or alternate actions, including those discussed elsewhere herein.

Various implementations of any or all of the foregoing aspects may include any one or more of the following additional features. The first electronic insurance card may be an electronic file containing the first insurance information. The first insurance information may include a name of the first party, a policy number, a description of an insured property, a name of an insurance agent, and/or contact information for the insurance agent. The first mobile communications device may be a smartphone. The first electronic insurance card may be stored on the memory element of the first mobile communications device (such as being a virtual insurance card). Capturing the second insurance information of the second party may include receiving the second insurance information of the second party stored on a second electronic insurance card of the second party (such as receiving a virtual insurance card from the second party's mobile device). Additionally or alternatively, capturing the second insurance information of the second party may include photographing a physical insurance card of the second party and extracting the second insurance information from the photograph (such as photographing a hardcopy insurance card and then extracting the party's information via object recognition or optical character recognition techniques).

The software application may also determine a procedure for initiating the insurance loss report and/or claim with a second insurance provider based upon the second insurance information of the second party, and initiating the insurance loss report and/or claim. The procedure for initiating the insurance loss report and/or claim may include transmitting the first insurance information and the second insurance information (and/or the two virtual insurance cards) to the second insurance provider via the communications element and the electronic communications network. Additionally or alternatively, the procedure for initiating the insurance loss report and/or claim may include transmitting the first insurance information and the second insurance information (and/or the two virtual insurance cards) to an agent of the second insurance provider via the communications element and the electronic communications network. The software application may also transmit one or more electronic images taken with the first mobile communications device (such as mobile device images of vehicles involved in a collision) and relevant to the loss report and/or claim to the first insurance provider via the communications element and the electronic communications network. The software application may also transmit a geographic location (such as a Global Positioning System (GPS) location) determined by the first mobile communications device and relevant to the loss report and/or claim to the first insurance provider via the communications element and the electronic communications network.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for facilitating exchanging insurance information and initiating insurance loss reports and/or claims. More particularly, in a vehicle collision, injury, or other loss incident, embodiments provide an electronic (or virtual) insurance card containing insurance information for storage on or other access by a mobile communications device of a first party and configured to be transmitted to another mobile communications device of a second party during initial information exchange following the incident and/or to be transmitted to one or more insurance providers during loss report and/or claim initiation.

The electronic insurance card may take the form of an electronic document or other file containing the insurance information. The insurance information may include a name of the first party, a policy number, a vehicle identification number or other description of an insured property, a name of an insurance agent, and contact information for the insurance agent. The electronic insurance card, or, at least some of the insurance information contained on the electronic insurance card may be transmittable and receivable between the mobile communications devices of the parties to the incident. In one implementation, such electronic exchange of the insurance information may be accomplished using a near-field communications (NFC) technology. Further, the electronic insurance card, or, at least, some or all of the insurance information contained on the electronic insurance card may be transmittable via an electronic communications network to one or more insurance providers as part of reporting the loss and/or initiating a claim.

A software application executed by the mobile communications device may facilitate contacting a loss-reporting and/or claim-making or other aspect of the insurance provider, transmitting the insurance information to the insurance provider, and interacting with the insurance provider to partially or wholly complete a loss report and/or initiate a claim. In various cases, the insurance providers may be the same provider for each party, different providers using the same or compatible electronic card technology, or different providers using different or incompatible physical or electronic card technologies.

If the other party to the incident does not have an electronic insurance card, the first party may use their mobile communications device to scan, photograph, or otherwise capture similar or the same insurance information from a physical insurance card. The software application may then use optical character recognition or similar technology to extract the insurance information into a useable electronic format. From the extracted information, the software application may identify the other party's insurance provider, determine an appropriate manner of initiating a claim, and initiate the claim.

Determining an appropriate manner of initiating a claim may include searching a look-up table or other local or remote information resource to determine the appropriate manner for the identified insurance provider. For example, in one implementation the appropriate manner may include communicating the insurance information directly to the insurance provider via the electronic communications network, while in another implementation it may include emailing the insurance information to an agent of record.

In one implementation, initiating a loss report and/or claim may include taking with the mobile communications device one or more photographs of the damaged property (e.g., damaged vehicle) and/or incident scene and communicating the photographs to the insurance provider along with the insurance information. In another implementation, initiating a loss report and/or claim may include determining with the mobile communications device a geographic location of the damaged property and/or incident scene and communicating the geographic location to the insurance provider along with the insurance information. Alternatively, one embodiment may be limited to reporting losses and making claims, and may not resolve liability for the underlying incidents.

Thus, it will be appreciated that the various embodiments and implementations may provide several advantages over existing information exchange and/or loss report and/or claim initiation processes. For example, electronically exchanging electronic information is less time-consuming than copying information by hand from physical cards, and avoids the potential for incorrectly copying information. Further, the ability to then electronically communicate the exchanged information to an insurance provider makes initiating claims much quicker and more efficient.

I. Exemplary System

Figure 1:
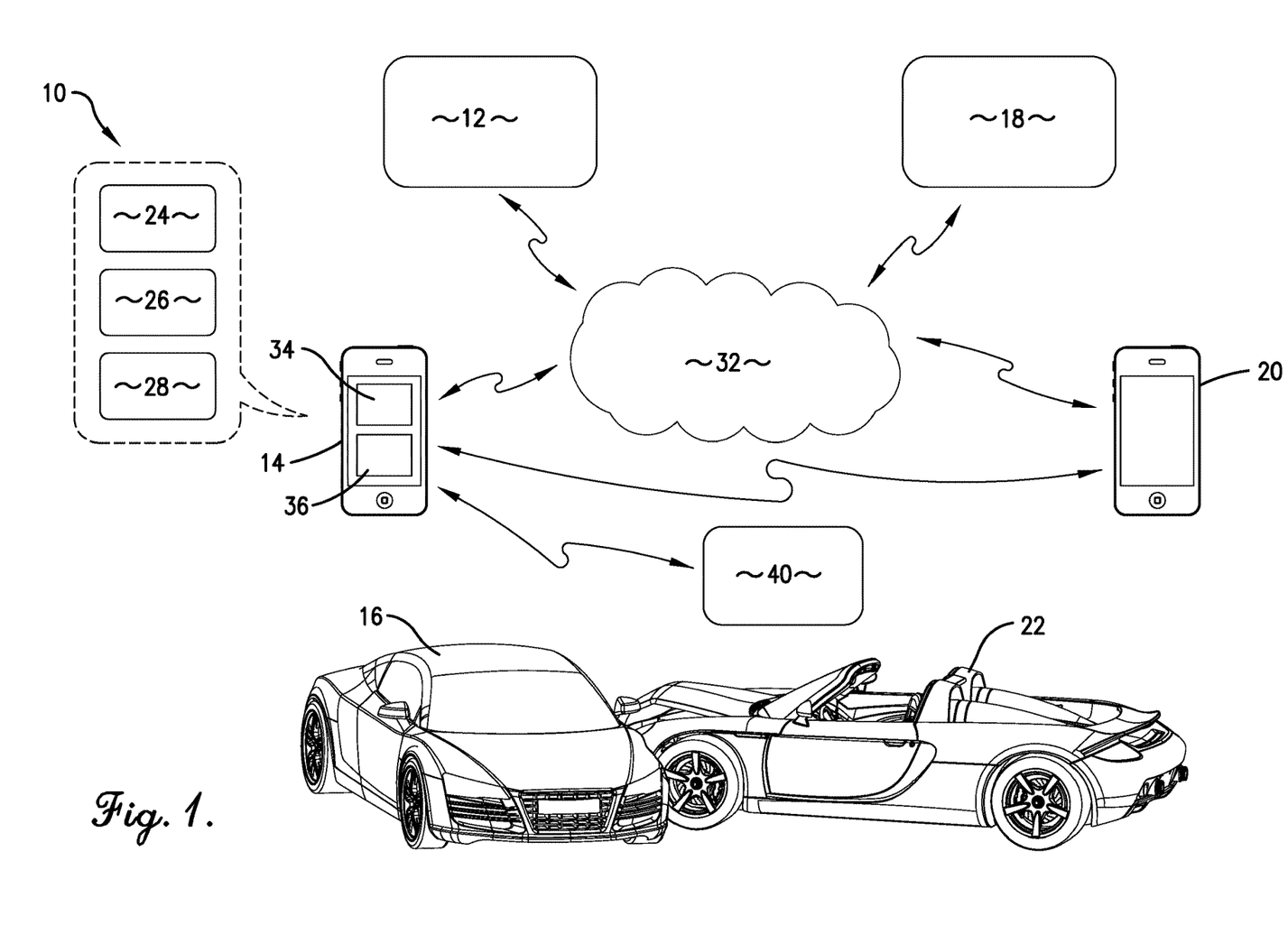
FIG. 1 is a depiction of an embodiment of an exemplary system for facilitating exchanging insurance information and initiating an insurance loss report and/or claim, wherein the system is shown in an exemplary operational environment.

Referring to FIG. 1, a system 10 and the exemplary operating environment in which it may be used, may include at least a first party who is insured by a first insurance provider 12 and who has a first mobile communications device 14 and a first insured property 16. The exemplary operating environment may further include at least a second party who is insured by the first insurance provider 12 or a second insurance provider 18 and who has a second mobile communications device 20 a second insured property 22.

At least the first mobile communications device 14 may include a first electronic memory 24, a first electronic processor 26, and a first electronic communications element 28. The electronic memory element 24 may be configured to store electronic data. The memory element 24 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The electronic processor 26 may be configured to execute a software application, which may involve accessing data stored on the memory element 24 and/or communications via the electronic communications element 28. The electronic communications element 28 may be configured to communicate data via a communications network 32, such as the Internet.

According to some embodiments, the communications element 28 may include one or more transceivers (e.g., WWAN, WLAN, and/or WPAN transceivers) functioning in accordance with IEEE standards, 3GPP standards, or other standards, and configured to receive and transmit data via one or more external ports. The communications network 32 may facilitate substantially any type of data communications via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The network 32 may also support various local area networks (LANs), personal area networks (PAN), or short range communications protocols.

The system 10 for facilitating exchanging insurance information and initiating insurance reports and/or claims may further include an electronic insurance card 34 containing insurance information, and an insurance software application 36 stored on or otherwise accessible by the mobile communications device 14. In an collision, injury, or other loss incident, the electronic insurance card 34 containing the insurance information for the first party may be transmitted from the first mobile communications device 14 of the first party to the second mobile communications device 20 of the second party during initial information exchange following the loss incident and/or to the first insurance provider 20 during initiation of a loss report and/or claim.

In various implementations, the electronic insurance card 34 may take the form of an electronic document or other file containing the insurance information, such as a virtual insurance card (and/or virtual driver's license). The insurance information may include a name of the first party, a policy number, a vehicle identification number or other description of an insured property, a name of an insurance agent, and contact information for the insurance agent. The electronic insurance card 34, or, at least some of the insurance information contained on the electronic insurance card 34 may be transmittable and receivable between the first and second mobile communications devices 14,20 of the parties to the incident.

In one implementation, such electronic exchange of the insurance information may be accomplished using a near-field communications technology or other wireless communication technology or data transmission. Further, the electronic insurance card 34, or, at least, some or all of the insurance information contained on the electronic insurance card 34 may be transmittable via the electronic communications network 32 to the first and/or second insurance providers 12,18 as part of reporting the incident and/or initiating a claim.

The software application 36 executed by the first mobile communications device 14 may facilitate contacting a loss-reporting, claim-making, or other aspect of the first and/or second insurance provider 12,18, transmitting the insurance information to one or both of the insurance providers 12,18, and interacting with one or both of the insurance providers 12,18 to partially or wholly complete a loss report and/or initiate a claim. In various cases, the first and second parties may have the same insurance provider, different providers using the same or compatible electronic card technology, or different providers using different or incompatible physical or electronic card technologies.

If the second party also has an electronic insurance card stored on their second mobile communications device 20, then the second party may similarly exchange or transmit their insurance information. Additionally or alternatively, if the second party to the incident has a physical insurance card 40, the first party may use their first mobile communications device 14 to scan, photograph, or otherwise capture similar or the same insurance information from the physical insurance card 40. The software application 36 may then use optical character recognition or similar technology to extract the insurance information into a useable electronic format. From the extracted information, the software application 36 may identify the second party's insurance provider, determine an appropriate manner of initiating a loss report and/or claim, and initiate the loss report and/or claim.

Determining an appropriate manner of initiating a loss report and/or claim may include searching a look-up table or other local or remote information resource to determine the appropriate manner for the identified insurance provider. For example, in one implementation, the appropriate manner may include communicating the insurance information directly to with the insurance provider via the electronic communications network 32, while in another implementation, it may include emailing or otherwise communicating the insurance information to an agent of record.

In one implementation, initiating a loss report and/or claim may include taking with the first mobile communications device 14 one or more photographs of the damaged first property 16 and/or incident scene and communicating the photographs to the insurance provider 12 along with the insurance information. In one implementation, initiating a loss report and/or claim may include determining with the first mobile communications device 14 a geographic location of the damaged property 16 and/or incident scene and communicating the geographic location to the insurance provider 12 along with the insurance information. In one implementation, one embodiment may be limited to reporting losses and making claims, and may not resolve liability for the underlying incidents.

The system 10 may include more, fewer, or alternative components and/or perform more, fewer, or alternative actions, including those discussed elsewhere herein, and particularly those discussed in the following section describing the computer-implemented method.

II. Exemplary Computer-Implemented Method

Figure 2:
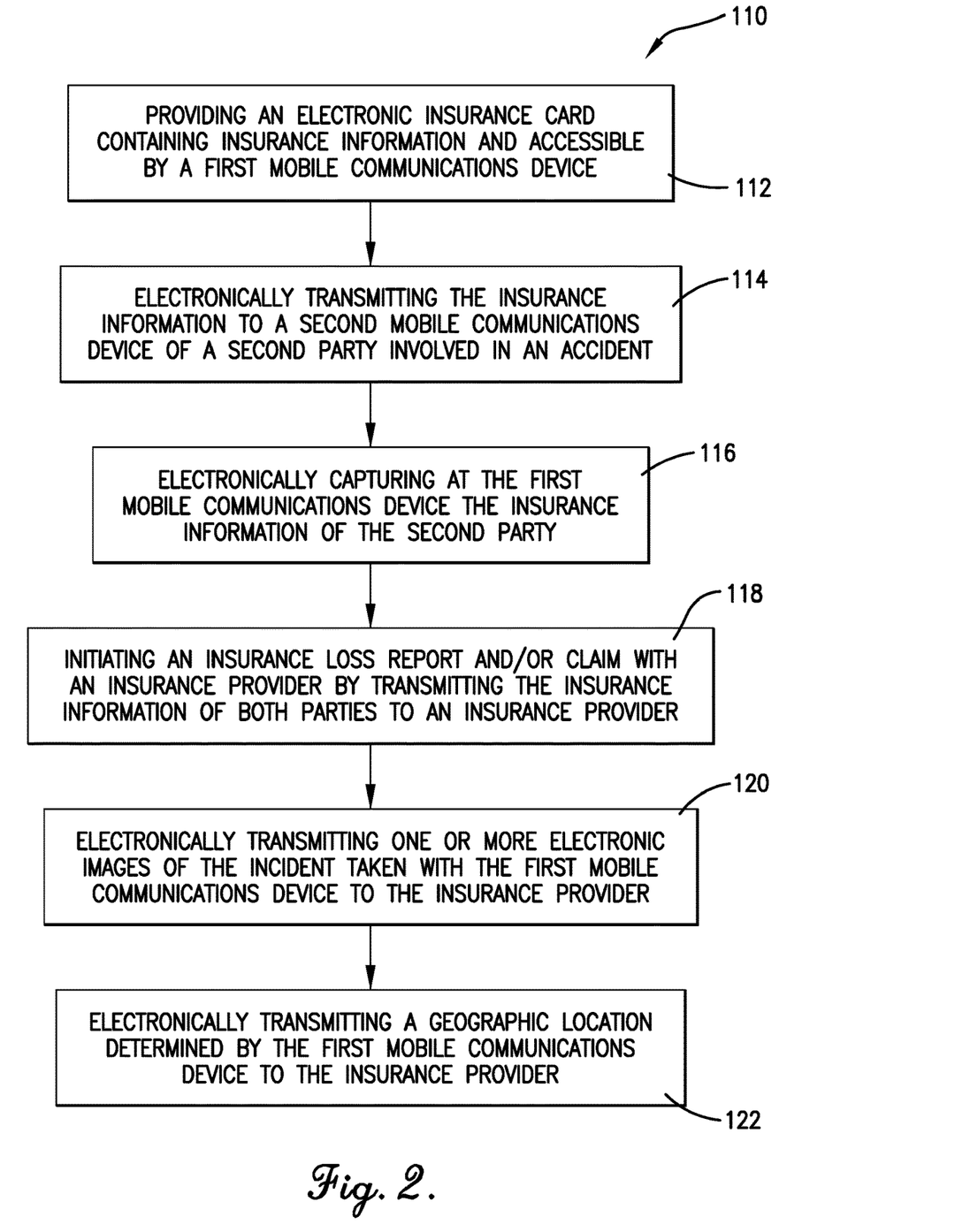
FIG. 2 is a flowchart of an embodiment of an exemplary computer-implemented method for facilitating exchanging insurance information and initiating an insurance loss report and/or claim.

Broadly, a computer-implemented method 110 for facilitating exchanging insurance information and insurance loss reports and/or claims using a mobile communications device may be a corollary to the functionality of the system 10 of FIG. 1, and may be similarly implemented using the various components of the system 10 within the above-described exemplary operating environment. Referring to FIG. 2, the method 110 may broadly comprise the following. An electronic insurance card 34 containing insurance information may be provided to a first party who is a customer of a first insurance provider 12, wherein the electronic insurance card 34 is stored on or otherwise accessible by a first smartphone or other mobile communications device 12, as shown in 112. The electronic insurance card 34 may be an electronic file containing the insurance information, and the insurance information may include a name of the first party, a policy number, a vehicle identification number or other description of an insured property, a name of an insurance agent, and contact information for the insurance agent.

A software application 36 may also be provided which is stored on and executable by the first mobile communications device 12 to electronically transmit the insurance information of the first party to a second mobile communications device 20 of a second party, as shown in 114. The software application 36 may further electronically capture the insurance information of the second party at the first mobile communications device 14 of the first party, as shown in 116. This may be accomplished by electronically receiving the insurance information of the second party similarly contained on a second electronic insurance card of the second party, or it may be accomplished by photographing a physical insurance card 40 of the second party and extracting the insurance information of the second party from the photographed physical insurance card 40.

The software application 36 may further initiate the insurance loss report and/or claim with one or more insurance providers 12,18 by transmitting the insurance information of the first and second parties to the insurance providers 12,18 via an electronic communications network 32, as shown in 118. This may be accomplished by determining a procedure for initiating the insurance loss report and/or claim with a second insurance provider 18, and to initiate the insurance loss report and/or claim. Further, initiating the insurance loss report and/or claim may include transmitting the insurance information to the second insurance provider 18 via the electronic communications network 32, or by emailing or otherwise transmitting the insurance information to an agent of the second insurance provider 18 via the electronic communications network 32.

The method 110 may further include the software application 36 being executable by the first mobile communications device 14 to transmit one or more electronic images of, e.g., the damaged property or vehicle 16 or other aspects of the incident taken with the mobile communications device 14 and relevant to the loss report and/or claim to the insurance provider 12 via the electronic communications network 32, as shown in 120.

The method 110 may further include the software application 36 being executable by the mobile communications device 14 to transmit a geographic location determined by the mobile communications device 14 and relevant to the loss report and/or claim to the insurance provider 12 via the electronic communications network 32, as shown in 122. The computer-implemented method may include more, fewer, or alternative actions, including those discussed elsewhere herein.

III. Exemplary Computer-Readable Medium

Referring again to FIG. 2, an exemplary non-transitory computer-readable medium with an executable program stored thereon for facilitating exchanging insurance information and insurance loss reports and/or claims using a mobile communications device may be a corollary to the functionality of the system 10 of FIG. 1, and may be similarly implemented using the various components of the system 10 within the above-described exemplary operating environment.

The executable program stored on the computer-readable medium may broadly instruct the various components of the system 10 to perform the following method 110. An electronic insurance card 34 containing insurance information may be provided to a first party who is a customer of a first insurance provider 12, wherein the electronic insurance card 34 is stored on or otherwise accessible by a first smartphone or other mobile communications device 14, as shown in 112. The electronic insurance card 34 may be an electronic file containing the insurance information, and the insurance information may include a name of the first party, a policy number, a vehicle identification number or other description of an insured property, a name of an insurance agent, and contact information for the insurance agent.

A software application 36 may also be provided which is stored on and executable by the first mobile communications device 12 to electronically transmit the insurance information of the first party to a second mobile communications device 20 of a second party, as shown in 114. The software application 36 may further electronically capture the insurance information of the second party at the first mobile communications device 14 of the first party, as shown in 116. This may be accomplished by electronically receiving the insurance information of the second party similarly contained on a second electronic insurance card of the second party, or it may be accomplished by photographing a physical insurance card 40 of the second party and extracting the insurance information of the second party from the photographed physical insurance card 40.

The software application 36 may further initiate the insurance loss report and/or claim with one or more insurance providers 12,18 by transmitting the insurance information of the first and second parties to the insurance providers 12,18 via an electronic communications network 32, as shown in 118. This may be accomplished by determining a procedure for initiating the insurance loss report and/or claim with a second insurance provider 18, and to initiate the insurance loss report and/or claim. Further, initiating the insurance loss report and/or claim may include transmitting the insurance information to the second insurance provider 18 via the electronic communications network 32, or by emailing or otherwise transmitting the insurance information to an agent of the second insurance provider 18 via the electronic communications network 32.

The method 110 may further include the software application 36 being executable by the first mobile communications device 14 to transmit one or more electronic images of, e.g., the damaged property or vehicle 16 or other aspects of the incident taken with the mobile communications device 14 and relevant to the loss report and/or claim to the insurance provider 12 via the electronic communications network 32, as shown in 120.

The method 110 may further include the software application 36 being executable by the mobile communications device 14 to transmit a geographic location determined by the mobile communications device 14 and relevant to the loss report and/or claim to the insurance provider 12 via the electronic communications network 32, as shown in 122.

The executable program stored on the non-transitory computer-readable medium may instruct the system to perform more, fewer, or alternative actions, including those discussed elsewhere herein, and particularly those discussed in the section describing the computer-implemented method.

IV. Exemplary Embodiments

Figure 3:
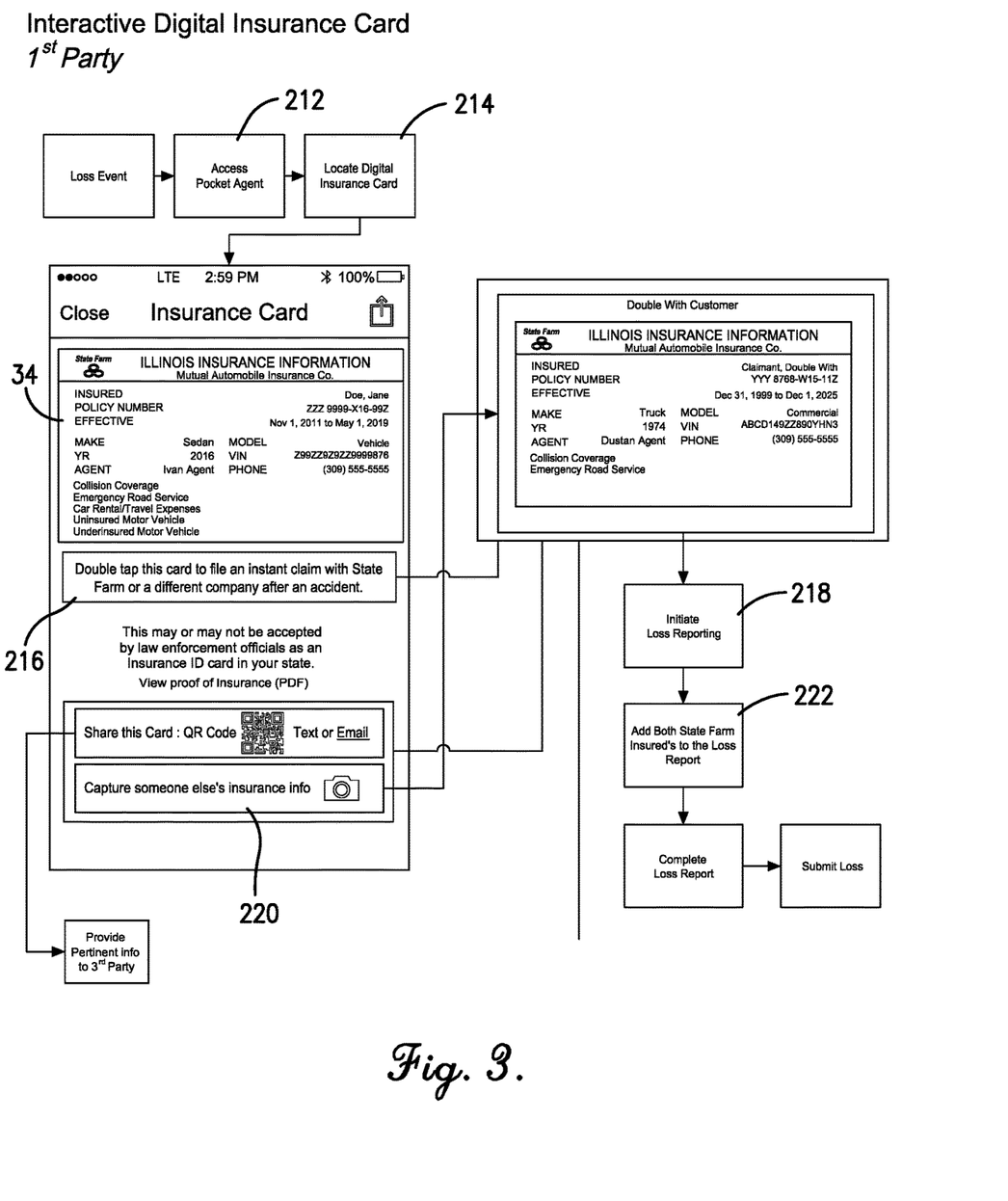
FIG. 3 is a block diagram of an exemplary first implementation of the system and method for facilitating exchanging insurance information and initiating an insurance loss report and/or claim.

Referring to FIG. 3, one exemplary implementation of the foregoing embodiments may proceed substantially as follows. In this implementation, the loss incident may involve only a single party and their insured property 16. On their mobile communications device 14, the party may activate the software application 36, as shown in 212, and may display their electronic insurance card 34, as shown in 214. The party may select (e.g., double-tap) the displayed electronic insurance card 34 to initiate reporting the loss incident and/or filing a claim, as shown in 216. The software application 36 may transmit the insurance information contained in the electronic insurance card 34 to the insurance provider 12 via the electronic communications network 32. The insurance provider 12 may prompt the party to answer one or more questions or otherwise provide additional information. For example, the insurance provider 12 may ask the single party, "Do you want to file a report a loss and/or make a claim?" If the party answers affirmatively, they may be transferred to a loss reporting and/or claim making system which takes them through the process. Thus, having received the party's insurance information, the insurance provider 12 may initiate and ultimately complete a loss report, as shown in 218, and submit the loss report as part of making a claim.

Referring again to FIG. 3, another exemplary implementation may involve at least the first and second parties, who have the same insurance provider 12, and their insured properties 16,22. On the first mobile communications device 14, the first party may activate the software application 36, as shown in 212, and may display the first electronic insurance card 34, as shown in 214. The first party may select (e.g., double-tap) the displayed first electronic insurance card 34 to initiate reporting the loss incident and/or filing a claim, as shown in 216. The software application 36 may transmit the insurance information contained in the first electronic insurance card 34 to the insurance provider 12 via the electronic communications network 32. The insurance provider 12 may prompt the first party to answer one or more questions or otherwise provide additional information. For example, the insurance provider 12 may ask the first party, "Do you want to file report a loss and/or make a claim?" If the first party answers affirmatively, the first party may be transferred to a loss reporting and/or claim making system which takes the first party through the process.

This may include asking the first party, "Is another party involved in the incident?" If the first party answers affirmatively, the first party may be prompted to capture the second party's insurance information and transmit it to the insurance provider 12, as shown in 220. If the second party also has an electronic insurance card, then the first party may electronically receive the second party's electronic insurance card on the first mobile communications device 14 and then transmit it to the insurance provider 12 via the electronic communications network 32. Further, the second party may undertake a similar or the same process with the first party's electronic insurance card 34. Additionally or alternatively, if the second party has a physical insurance card 40, then the first party may scan, photograph, or otherwise capture the second party's physical insurance card 40 with the first mobile communications device 14, the software application 36 may use OCR or other technology to extract the second party's insurance information into a useable format, and then transmit it to the insurance provider 12 via the electronic communications network 32. The insurance provider 12 may initiate and ultimately complete a loss report, as shown in 218, including adding both parties' insurance information to the loss report, as shown in 222, and submit the loss report as part of making a claim on behalf of one or more of the parties.

Figure 4:
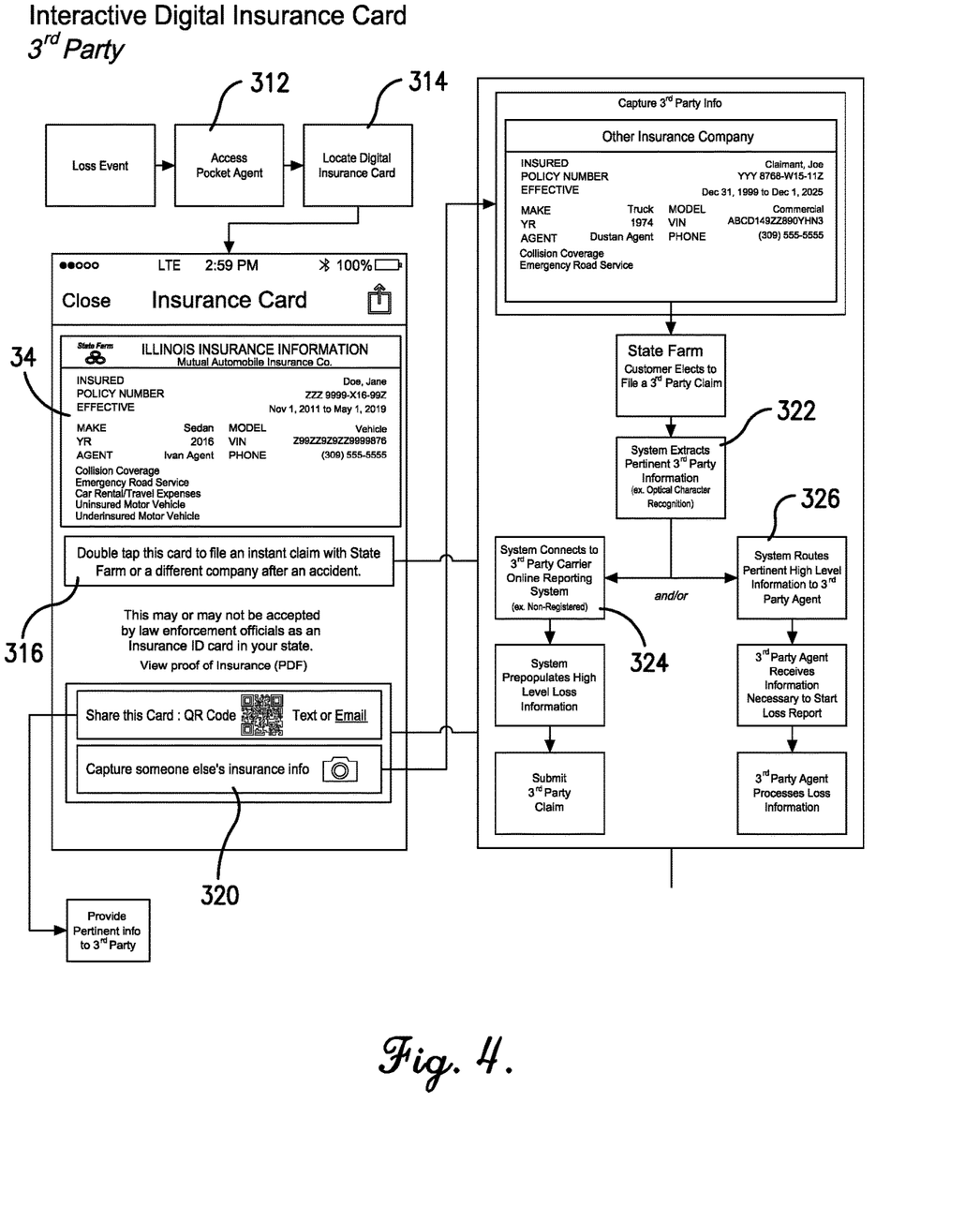
FIG. 4 is a block diagram of an exemplary second implementation of the system and method for facilitating exchanging insurance information and initiating an insurance loss report and/or claim.

Referring also to FIG. 4, another exemplary implementation may involve at least the first and second parties, who have different insurance providers 12,18, and their insured properties 16,22. On the first mobile communications device 14, the first party may activate the software application 36, as shown in 312, and may display their electronic insurance card 34, as shown in 314. The first party may select (e.g., double-tap) their displayed electronic insurance card 34 to initiate reporting the loss incident and/or filing a claim, as shown in 316. The software application 36 may transmit the insurance information to the first insurance provider 12 via the electronic communications network 32, as shown in 206. The first insurance provider 12 may prompt the first party to answer one or more questions or otherwise provide additional information. For example, the first insurance provider 12 may ask the first party, "Do you want to file report a loss and/or make a claim with us or a different insurer?" If the first party chooses the former then the process may proceed as described in the second example, above, and if the first party chooses the latter then the process may proceed as follows as the software application 36 takes the first party through the process.

The software application 46 may ask the first party, "Is another party involved in the incident?" If the first party answers affirmatively, the first party may be prompted to capture the second party's insurance information, as shown in 320. If the second party also has an electronic insurance card, then the first party may electronically receive the second party's electronic insurance card on the first mobile communications device 14 and then transmit it to the second insurance provider 18 via the electronic communications network 32. Additionally or alternatively, if the second party only has a physical insurance card 40, then the first party may scan, photograph, or otherwise capture the second party's physical insurance card 40 with the first mobile communications device 14, and the software application 36 may use OCR or other technology to extract the second party's insurance information into a useable format. The software application 36 may then identify the second insurance provider 18 from the second party's captured insurance information, as shown in 322.

If the second insurance provider 18 has an online loss-reporting and/or claim-making system, then the software application 36 may initiate a loss report and/or claim with the second insurance provider 18 via the electronic communications network 32, as shown in 324. If the second insurance provider 18 does not have an online loss-reporting and/or claim-making system, then the software application 36 may transmit the insurance information and any other information to an agent of the second insurance provider 18 with a request to initiate a loss report and/or make a claim, as shown in 326. In one implementation, the software application 36 may both use the second insurance provider's online system and transmit the information to the agent.

Additional examples of the foregoing implementations may involve more than two parties, some of whom may have electronic insurance cards and/or the same insurance providers and some of whom may not, and may proceed substantially similar or the same as described in this and/or other examples.

V. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to property insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; pert insurance, personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" may be used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

I claim:

1. A computer-implemented method for facilitating exchanging insurance information and initiating an insurance loss report or a claim using a mobile communications device, the computer-implemented method comprising:
   storing, by one or more processors, first insurance information on a first electronic insurance card, wherein the first electronic insurance card is accessible by a first mobile communications device of a first party;
   transmitting, by a processor of the first mobile communications device of the first party, the first insurance information of the first party to a second mobile communications device of a second party;
   capturing, by the processor of the first mobile communications device of the first party, second insurance information of the second party;
   receiving, by a processor of the first mobile communications device of the first party, location information of a damaged property or an incident scene from a global positioning system (GPS);
   determining, by the processor of the first mobile communications device, a geographic location of the damaged property or the incident scene based on the location information, the geographic location being relevant to the insurance loss report or the claim; and
   electronically initiating, by the processor of the first mobile communications device of the first party, the insurance loss report or the claim with an insurance provider by transmitting, via an electronic communications network, the first insurance information of the first party, the second insurance information of the second party, and the geographic location of the damaged property or the incident scene to the insurance provider.

2. The computer-implemented method as set forth in claim 1, wherein the first electronic insurance card is an electronic file containing the first insurance information.

3. The computer-implemented method as set forth in claim 1, wherein the first insurance information includes a name of the first party, a policy number, a description of an insured property, a name of an insurance agent, and contact information for the insurance agent.

4. The computer-implemented method as set forth in claim 1, wherein the first mobile communications device is a smartphone.

5. The computer-implemented method as set forth in claim 1, wherein the first electronic insurance card is stored on the first mobile communications device.

6. The computer-implemented method as set forth in claim 1, wherein capturing the second insurance information of the second party includes receiving the second insurance information of the second party stored on a second electronic insurance card of the second party.

7. The computer-implemented method as set forth in claim 1, wherein capturing the second insurance information of the second party includes photographing a physical insurance card of the second party, and extracting the second insurance information from the photograph of the physical insurance card of the second party.

8. The computer-implemented method as set forth in claim 1, wherein capturing the second insurance information of the second party includes photographing a physical insurance card of the second party, and using optical character recognition techniques to extract the second insurance information from the photograph of the physical insurance card of the second party.

9. The computer-implemented method as set forth in claim 1, further including determining a procedure for initiating the insurance loss report or the claim with a second insurance provider based upon the second insurance information of the second party, and initiating the insurance loss report or the claim with the second insurance provider.

10. The computer-implemented method as set forth in claim 9, wherein the procedure for initiating the insurance loss report or the claim includes transmitting the first insurance information and the second insurance information to the second insurance provider via the electronic communications network.

11. The computer-implemented method as set forth in claim 9, wherein the procedure for initiating the insurance loss report or the claim includes transmitting the first insurance information and the second insurance information to an agent of the second insurance provider via the electronic communications network.

12. The computer-implemented method as set forth in claim 1, further including transmitting one or more electronic images taken with the first mobile communications device and relevant to the insurance loss report or the claim to the insurance provider via the electronic communications network.

13. A system for facilitating exchanging insurance information and initiating an insurance loss report or a claim using a mobile communications device, the system comprising:

a memory element configured to store electronic data;
a processing element configured to execute software applications;
a communications element configured to communicate electronic data via an electronic communications network;
a first electronic insurance card containing first insurance information, wherein the first electronic insurance card is accessible by a first mobile communications device of a first party; and
a software application which is stored on the memory element, wherein the software application is executable by the processing element of the first mobile communications device to:
  transmit, by the communications element of the first mobile communications device of the first party, the first insurance information of the first party to a second mobile communications device of a second party;
  capture, by the processing element of the first mobile communications device of the first party, second insurance information of the second party;
  receive, by the processing element of the first mobile communications device of the first party, location information of a damaged property or an incident scene from a global positioning system (GPS);
  determine, by the processing element of the first mobile communications device of the first party, a geographic location of the damaged property or the incident scene based on the location information, the geographic location being relevant to the insurance loss report or the claim; and
  electronically initiate, by the processing element of the first mobile communications device of the first party, the insurance loss report or the claim with an insurance provider by transmitting, via the communications element and the electronic communications network, the first insurance information of the first party, the second insurance information of the second party, and the geographic location of the damaged property or the incident scene to the insurance provider.

14. The system as set forth in claim 13, wherein the first electronic insurance card is an electronic file containing the first insurance information.

15. The system as set forth in claim 13, wherein the first insurance information includes a name of the first party, a policy number, a description of an insured property, a name of an insurance agent, and contact information for the insurance agent.

16. The system as set forth in claim 13, wherein the first mobile communications device is a smartphone.

17. The system as set forth in claim 13, wherein the first electronic insurance card is stored on the memory element of the first mobile communications device.

18. The system as set forth in claim 13, wherein capturing the second insurance information of the second party includes receiving the second insurance information of the second party stored on a second electronic insurance card of the second party.

19. The system as set forth in claim 13, wherein capturing the second insurance information of the second party includes photographing a physical insurance card of the second party and extracting the second insurance information from the photograph of the physical insurance card of the second party.

20. The system as set forth in claim 13, wherein capturing the second insurance information of the second party includes photographing a physical insurance card of the second party, and using optical character recognition techniques to extract the second insurance information from the photograph of the physical insurance card of the second party.

* * * * *